UNITED STATES PATENT OFFICE.

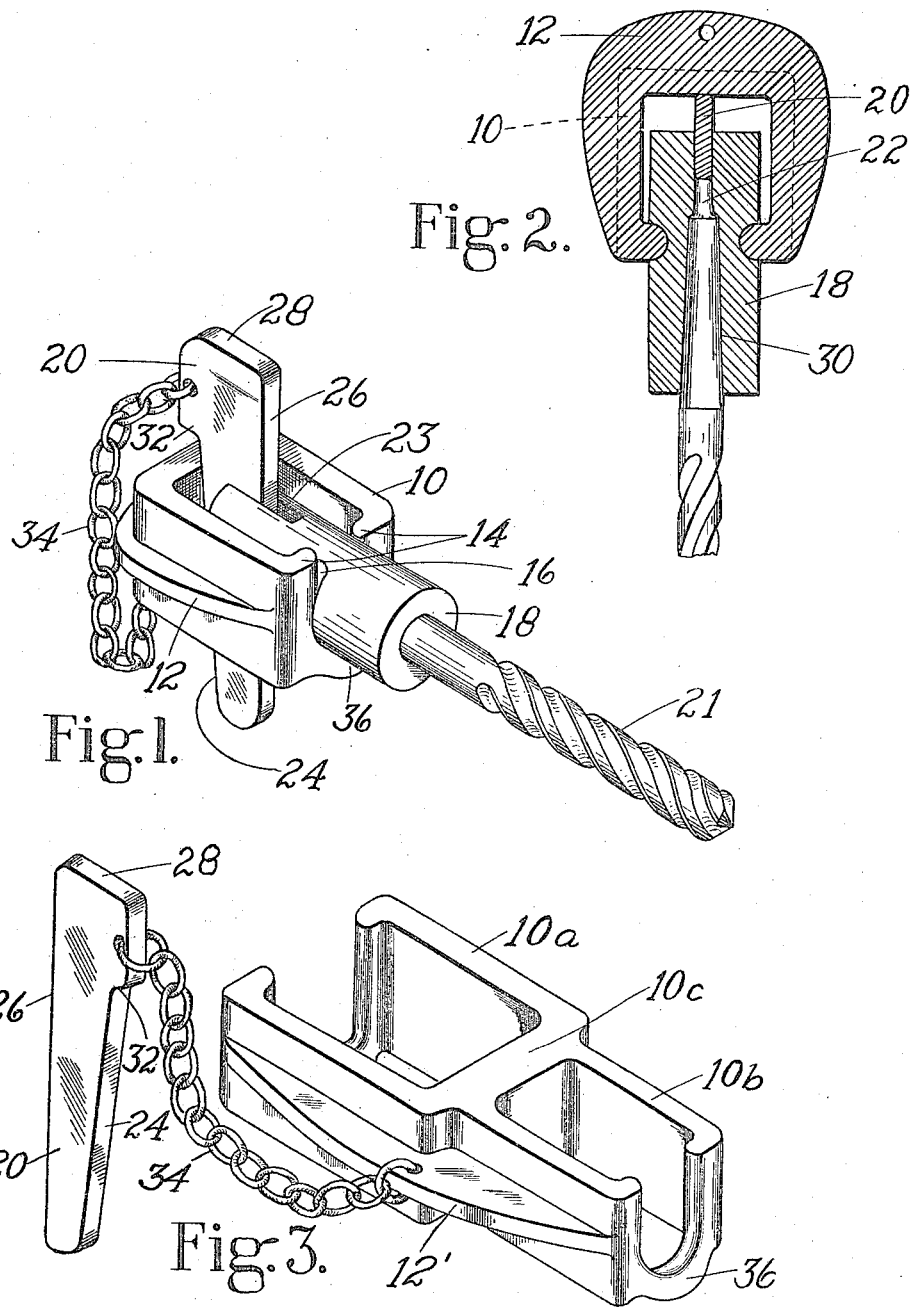

PAUL J. KELLEY, OF BEVERLY, MASSACHUSETTS.

DEVICE FOR USE WITH COLLETS.

1,227,626.   Specification of Letters Patent.   Patented May 29, 1917.

Application filed May 28, 1915. Serial No. 30,962.

*To all whom it may concern:*

Be it known that I, PAUL J. KELLEY, a citizen of the United States, residing at Beverly, in the county of Essex and State of Massachusetts, have invented certain Improvements in Devices for Use with Collets, of which the following description, in connection with the accompanying drawings, is a specification, like reference characters on the drawings indicating like parts in the several figures.

This invention relates primarily to devices for use with collets or bushings that are commonly used to hold tools in a chuck or machine spindle. Such tools are of various kinds such as drills, reamers and milling cutters but they will hereinafter be referred to broadly as tools.

In machine shop practice it is necessary of course, to change the tool in such chuck or spindle frequently and as the supply of such collets is usually limited, it is often necessary to remove, from a collet, the tool which has previously been used therein and substitute another size or kind therefor. Present methods usually employed for removing such tools from collets are generally unsatisfactory and expensive because much time is wasted and much of the shop equipment is injured or even rendered useless by the treatment which it receives during such removal.

It is an object of the present invention to produce a simple and effective device by which a positive and powerful force can be exerted between a tool and a collet without injury to the collet and which can be used for loosening a tool in a collet so that it can be readily removed therefrom.

To this end, a feature of the invention comprises a collet holder provided with means for engaging a collet so that longitudinal movement relatively to the holder is restrained and also provided with means between the holder and a tool in such collet for moving the tool relatively to the collet.

Other features and objects of the invention will be apparent when the following description is considered in connection with the accompanying drawings in which, Figure 1 shows a tool, which in this instance is a drill, in a collet and it also shows one specific form of device embodying the present invention, in position for removing the drill from the collet;

Fig. 2 is a longitudinal sectional view of the parts shown in Fig. 1; and

Fig. 3 shows a form of the device in which provision is made for holding two different sizes of collets, but which may be modified in a similar manner so as to accommodate a still greater number of collets.

For the purposes of illustration, the invention is shown embodied in one specific form of device for removing tools from the collets that are used in connection with a well-known type of chuck. In the use of this chuck, the tool and its collet may be inserted in or removed from the chuck while it is in motion. Such collets commonly have two oppositely disposed partially circumferential grooves, as shown, which engage a part of the chuck but which, according to the present invention, may be engaged by the collet holder. However, it is obvious that this invention is not limited to the specific construction shown but may be varied in many ways within the scope of the invention as defined in the appended claims.

Referring to the invention in detail, 10 is a collet holder which is yoke-shaped and which is strengthened by a rib 12. Projections 14 extend from the sides of the yoke and engage oppositely disposed grooves 16 upon the collet 18, these grooves being those, hereinbefore referred to, by which this particular kind of collet is engaged in the chuck in which it is used. It will be seen that the projections 14 and grooves 16 form a tongue and groove connection between the collet and holder. A drift pin 20 is shown in Figs. 1 and 2 in position to loosen the drill 21 in the collet, this drift pin having converging edges 24 and 26 which engage the central portion of the collet holder and the end 22 of the drill that is exposed in the slot 23 of the collet. When this drift pin, or any other suitable tapered member, has been placed in the position shown in Figs. 1 and 2 and is struck upon its end 28 by a hammer, or this end is struck against a bench or other solid mass, the converging edges, by engaging the yoke and end of the drill, exert a positive and powerful force to loosen the drill in the socket 30, the collet being, at the same time, retained in fixed relation with the holder by means of the projections 14. In its preferred form, the drift pin is provided with a stop 32, extending from one of the converging edges, which prevents it from being driven completely through the holder. In order that the drift pin and collet holder may always be ready for instant use, they are connected by a flexible chain 34 or they can be connected by any other suitable means. To provide means for holding the collet, the projections 14 are connected by a strap or support 36, this support 36 being preferably curved in order to fit the cylindrical surface of the collet.

As at least two sizes of chucks are commonly used in shop practice, each chuck requiring a special size of collet, it is convenient to provide a device for loosening a tool from either of these sizes of collets and for this purpose the construction shown in Fig. 3 is adapted. As therein shown, the holder consists of two parts 10$^a$ and 10$^b$, both parts being similar to the holder 10 shown in the other views but of different sizes and being connected to form a single abutment 10$^c$ against one or the other side of which the drift pin can act, according to which portion of the holder contains the collet and tool. In this construction, a common strengthening rib 12' is provided on each side of the holder but only one of these ribs is visible in the drawing.

Having described my invention, what I claim as new and desire to secure by Letters Patent of the United States is:—

1. A device for use with collets, having, in combination, a collet holder comprising parts, which are immovable relatively to each other, for engaging a collet and for restraining the collet from longitudinal movement relatively to the holder, and means, arranged to be placed between the holder and a tool in the collet, for moving the tool relatively to the collet.

2. A device for use with collets, having, in combination, a collet holder provided with means for engaging a collet and restraining it from movement relatively to the holder in all directions except one, and a tapered member, arranged to be driven between the holder and a tool in the collet.

3. A device for use with collets, having, in combination, a collet holder comprising parts, which are immovable relatively to each other, for engaging a collet and for restraining it from movement relatively to the holder in all directions except one, and means, arranged to be placed between the holder and a tool in the collet, for moving the tool relatively to the collet.

4. A device for use in removing tools from collets, having, in combination, a yoke-shaped collet holder provided with a projection for engaging a groove on a collet, and a tapered member, arranged to be driven between the holder and a tool in the collet, to loosen the tool in the collet.

5. A device for use in removing tools from collets, having, in combination, a collet holder provided with means for engaging a collet and restraining it from movement relatively to the holder in all directions except one, a tapered member, arranged to be driven between the holder and a tool in the collet, to loosen the tool in the collet, flexible means connecting the tapered member with the holder and a stop upon the tapered member, said stop being constructed to engage the holder to prevent the tapered member from being driven through the holder.

6. The combination of a yoke-shaped collet holder (10) having projections (14) and a support (36), with a drift pin (20) and flexible means (34) connecting the drift pin with the holder.

7. A device for use in removing tools from collets, having, in combination, a plurality of collet holders of different sizes joined together, each holder being provided with a support for a collet, means on each holder for engaging a collet of the corresponding size, and a tapered member, arranged to be driven between any holder and the exposed rear end of a tool in a collet in that holder, to loosen the tool in said collet.

In testimony whereof I have signed my name to this specification.

PAUL J. KELLEY.

Copies of this patent may be obtained for five cents each, by addressing the "Commissioner of Patents, Washington, D. C."